UNITED STATES PATENT OFFICE.

JOSEPH HAY AMIES, OF PHILADELPHIA, PENNSYLVANIA, ASSIGNOR TO THE AMIES ASPHALT COMPANY, OF PHILADELPHIA, PENNSYLVANIA, A CORPORATION OF SOUTH DAKOTA.

COMPOSITION FOR PAVING PURPOSES.

934,494.  Specification of Letters Patent.  Patented Sept. 21, 1909.

No Drawing.   Application filed February 20, 1909.   Serial No. 479,255.

*To all whom it may concern:*

Be it known that I, JOSEPH HAY AMIES, a citizen of the United States, residing at Philadelphia, in the county of Philadelphia and State of Pennsylvania, have invented a certain new and useful Composition for Paving Purposes, of which the following is a specification.

My invention has for its principal object the employment of a waste product known as air slaked lime, in forming a composition for paving or like purposes. I may however use crushed or ground carbonate of lime in cases where the above said air slaked lime cannot be procured.

My process is as follows:—I place a batch quantity of broken stone, gravel or like materials upon a mixing board or in a mixing machine and mix them with any desirable light oil. I then pour thereon and thereover and mix well therewith a due quantity of boiling asphalt or other like elements suitable for paving compositions. I then throw thereon and mix therewith a due amount of air slaked lime or crushed carbonate of lime or a mixture of these to cover the individual particles of the said composition, and thus form a granular and friable mass that will adhere together and form a solid mass under pressure.

What I claim is:—

The herein described method of making a composition for paving purposes which consists in taking mineral materials and the like, coating them with a light oil, then mixing them with a binder as hot asphalt, and then coating the particles of the said composition with air slaked lime, crushed carbonate of lime, or lime powder, as fully set forth.

In testimony whereof I hereunto sign my name.

JOSEPH HAY AMIES.

In presence of—
S. F. KOCH,
WILLIAM F. JACKSON.